United States Patent
Tanaka et al.

(10) Patent No.: US 12,482,899 B2
(45) Date of Patent: Nov. 25, 2025

(54) NONWOVEN FABRIC AND BATTERY SEPARATOR

(71) Applicant: UBE EXSYMO CO., LTD., Tokyo (JP)

(72) Inventors: Naoki Tanaka, Tokyo (JP); Yuuki Meguro, Tokyo (JP)

(73) Assignee: UBE EXSYMO CO., LTD., Tokyo (JP)

( * ) Notice: Subject to any disclaimer, the term of this patent is extended or adjusted under 35 U.S.C. 154(b) by 830 days.

(21) Appl. No.: 16/628,265

(22) PCT Filed: May 18, 2018

(86) PCT No.: PCT/JP2018/019247
§ 371 (c)(1),
(2) Date: Jan. 3, 2020

(87) PCT Pub. No.: WO2019/017063
PCT Pub. Date: Jan. 24, 2019

(65) Prior Publication Data
US 2020/0173074 A1   Jun. 4, 2020

(30) Foreign Application Priority Data
Jul. 18, 2017  (JP) .................................. 2017-139512

(51) Int. Cl.
*H01M 50/489* (2021.01)
*D01F 8/06* (2006.01)
(Continued)

(52) U.S. Cl.
CPC ............ *H01M 50/489* (2021.01); *D01F 8/06* (2013.01); *D04H 1/5412* (2020.05);
(Continued)

(58) Field of Classification Search
None
See application file for complete search history.

(56) References Cited

U.S. PATENT DOCUMENTS 6,080,471 A * 6/2000 Shigematsu ........... D04H 1/492
428/311.11
2006/0178070 A1* 8/2006 Kritzer ................. D04H 1/4291
442/364

(Continued)

FOREIGN PATENT DOCUMENTS

CA    2918670 A1   2/2015
JP    2005-146428 A   6/2005
(Continued)

*Primary Examiner* — Jonathan G Leong
*Assistant Examiner* — Tony S Chuo
(74) *Attorney, Agent, or Firm* — HAUPTMAN HAM, LLP

(57) ABSTRACT

A non-woven fabric and a battery separator which have good handleability, high tensile strength and a thin thickness. The non-woven fabric is composed of a composite fiber of a core-sheath structure consisting of a core part and a sheath part covering the core part, wherein the core part of the composite fiber is formed of a first polyolefin-based resin, the sheath part of the composite fiber is formed of a second polyolefin-based resin having a melting point lower than that of the first polyolefin-based resin, a plurality of composite fibers are integrated by fusion-bonding the sheath parts each other, and the non-woven fabric has a basis weight of 3 g/m² or more and an amount of strain, S, of 50 mm² or less as calculated by a following formula (I)

$$S \text{ (mm}^2\text{)} = (MD_1 - MD_0) \times (CD_0 - CD_1) \tag{I}$$

7 Claims, 1 Drawing Sheet

(51) Int. Cl.
    *D04H 1/541* (2012.01)
    *H01M 50/417* (2021.01)
    *H01M 50/44* (2021.01)
    *H01M 50/491* (2021.01)
    *H01M 50/494* (2021.01)

(52) U.S. Cl.
    CPC ......... *H01M 50/417* (2021.01); *H01M 50/44* (2021.01); *H01M 50/491* (2021.01); *H01M 50/494* (2021.01)

(56) References Cited

U.S. PATENT DOCUMENTS

| | | | |
|---|---|---|---|
| 2013/0017451 A1* | 1/2013 | Kida | H01M 50/411 429/249 |
| 2015/0171397 A1* | 6/2015 | Yamada | H01M 10/0525 429/144 |
| 2015/0255768 A1* | 9/2015 | Konishi | H01M 50/403 429/144 |
| 2015/0270522 A1* | 9/2015 | Yamada | H01M 50/44 429/145 |
| 2019/0048528 A1* | 2/2019 | Watanabe | B32B 27/12 |

FOREIGN PATENT DOCUMENTS

| | | |
|---|---|---|
| JP | 2011165360 A | 8/2011 |
| JP | 2012-36518 A | 2/2012 |

\* cited by examiner

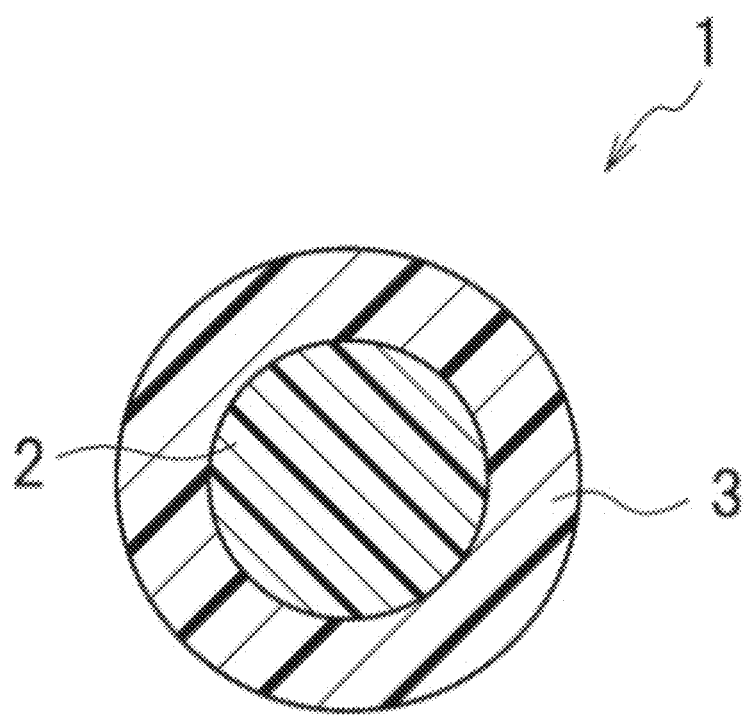

NONWOVEN FABRIC AND BATTERY SEPARATOR

RELATED APPLICATIONS

The present application is a National Phase of International Application Number PCT/JP2018/019247 filed May 18, 2018 and claims priority to Japanese Application Number 2017-139512 filed Jul. 18, 2017.

TECHNICAL FIELD

The present invention relates to a non-woven fabric and a battery separator using thereof. More specifically, the present invention relates to a non-woven fabric and a battery separator using a composite fiber having a core-sheath structure.

BACKGROUND ART

Since composite fibers having a core-sheath structure formed using a thermoplastic resin are fusion-bonded to each other by heating to be integrated, a non-woven fabric can be manufactured without using an adhesive, and such a composite fibers are mainly used for a material of a non-woven fabric for sanitary goods and the food field. On the other hand, a composite fiber using a polyolefin-based resin for a core part and a sheath part has excellent chemical resistance, and thus it is used as a battery separator On the other hand, although a battery separator is required to be further reduced in thickness in order to enhance the battery performance, when the thickness is reduced, sufficient strength cannot be obtained in the case of using a non-woven fabric, resulting in a problem of remarkable reduction of handleability etc. Therefore, a technique of reducing thickness of a non-woven fabric without reducing mechanical strength has been conventionally investigated (for example, see Patent Literatures 1, 2).

Patent Literature 1 proposes a non-woven fabric in which polyphenylene sulfide (PPS) fiber having a single fiber fineness of 0.5 dtex or less and a tensile strength of 3.0 cN/dtex or more is used so that sufficient strength can be maintained even if the thickness of the fabric is reduced. Patent Literature 2 proposes a non-woven fabric in which a cellulose fiber having an average fiber diameter of 0.1 to 50 μm and a polyolefin fiber having an average fiber diameter of 1.5 μm or less are used in combination so that both air permeability and mechanical strength can be achieved even in the thickness of the fabric is 20 μm or less.

CITATION LIST

Patent Literature

Patent Literature 1:
  Japanese Patent Application No. 2005-146428
Patent Literature 2:
  Japanese Patent Application No. 2012-36518

SUMMARY OF INVENTION

Technical Problem

However, the above-mentioned conventional techniques have the following problems. First, since the non-woven fabric described in Patent Literature 1 uses a PPS fiber having a melting point as high as 285° C., it is necessary to increase a temperature of a dryer to a high temperature and reduce a line speed to ensure sufficient time for application of heat in order to fusion-bond fibers each other in a paper-making process by means of a wet method. Therefore, the productivity of the non-woven fabric described in Patent Literature 1 is lower compared to that of a non-woven fabric in which a raw material fiber consisting of a polyolefin-based resin is used. Furthermore, the non-woven fabric described in Patent Literature 1 has an insufficient property as a battery separator, because a function of inhibiting ion conductivity (shutdown function) before thermal runaway of a battery occurs cannot be expected.

On the other hand, since the non-woven fabric described in Patent Literature 2 uses a cellulose fiber having a hydrophilic surface, it easily absorbs moisture, and thus needs careful drying treatment before being incorporated in the battery, when it is used for a separator of a non-aqueous battery system. The ultrafine polyolefin fiber produced by pulverization treatment as described in Patent Literature 2 is fibrillated, and fibers of thick fineness and fibers of ultrafine fineness coexist therein. Therefore, variations in pore diameter, thickness, smoothness and the like may easily occur in the non-woven fabric described in Patent Literature 2, and when the thickness is thinner, the influence of the variations is more remarkable. Consequently, a non-woven fabric having sufficient strength even if the thickness is 60 μm or less, being suitable for a battery separator, and having excellent handleability has not been achieved yet.

Therefore, the object of the present invention is to provide a non-woven fabric and a battery separator having good handleability and a tensile strength equal to or higher than the conventional one even if the thickness is thinner.

Solution to Problem

The non-woven fabric according to the present invention is a non-woven fabric having a thickness of 60 μm or less, the non-woven fabric being formed by integrating a composite fiber of a core-sheath structure consisting of a core part and a sheath part covering the core part by fusion-bonding the sheath parts each other, wherein the composite fiber has a fiber diameter of 3.4 to 4.5 μm, the core part is formed of a first polyolefin-based resin, the sheath part is formed of a second polyolefin-based resin having a melting point lower than that of the first polyolefin-based resin, a basis weight is 3 to 20 g/m², and an amount of strain, S, as calculated by a following formula 1

$$S\ (\text{mm}^2) = (MD_1 - MD_0) \lambda (CD_0 - CD_1) \quad \text{[Formula 1]}$$

is 50 mm² or less wherein $MD_1$ (mm) and $CD_1$ (mm) are lengths in MD direction and CD direction respectively when a tensile stress of 20 N in MD direction is applied to a sample having an effective length in MD direction ($MD_0$) of 100 mm and an effective length in CD direction ($CD_0$) of 100 mm under an environment of a room temperature of 25° C. and a humidity of 50% RH.

As the composite fiber, a composite fiber in which the first polyolefin-based resin is a polypropylene resin, the second polyolefin-based resin is a polyethylene resin, and a strength is 4 cN/dTex or more can be used.

The non-woven fabric of the present invention has, for example, a maximum pore diameter of 50 μm or less and an average pore diameter of 5 to 25 μm.

Furthermore, the non-woven fabric of the present invention may have a tensile strength per unit basis weight in CD direction and/or MD direction of 0.6 (N/15 mm)/(g/m²) or more.

The battery separator according to the present invention uses the above-mentioned non-woven fabric.

This battery separator can be immersed in an electrolyte prepared by dissolving $LiPF_6$ in a solvent obtained by mixing ethylene carbonate and methyl ethyl carbonate in a volume ratio of ethylene carbonate:methyl ethyl carbonate=3:7 to a concentration of 1.1 mol/L, and then a membrane resistance value measured by sandwiching the separator using aluminum plates may be 0.002 to 0.007 $\Omega/\mu m$.

In the present invention, "basis weight" is a mass per unit area, "CD direction" is width direction of a non-woven fabric, "MD direction" is machine (length) direction of a non-woven fabric. "Effective length" is an actual length of the part which is subjected to an evaluation, and does not include the part supported by a tool etc.

Advantageous Effect of Invention

According to the present invention, a composite fiber of a core-sheath structure formed of a polyolefin-based resin is used, and a basis weight and an amount of strain, S, are within the specific range, and thus a non-woven fabric and a battery separator having a tensile strength equal to or higher than the conventional one even if the thickness is thinner can be obtained.

BRIEF DESCRIPTION OF DRAWING

The FIGURE shows a cross sectional view of a structure of a composite fiber constituting a non-woven fabric according to the first embodiment of the present invention.

DESCRIPTION OF EMBODIMENTS

Hereinafter, the modes for carrying out the present invention will be described in detail in reference to the appending drawing. The present invention is not limited to the embodiments described below.

First Embodiment

The non-woven fabric according to the first embodiment of the present invention is formed by integrating a composite fiber of a core-sheath structure consisting of a polyolefin-based resin by fusion-bonding the sheath parts each other, and the basis weight is 3 $g/m^2$ or more, the amount of strain is 50 $mm^2$ or less.

[Composite Fiber]

The FIGURE shows a cross sectional view of a structure of a composite fiber constituting a non-woven fabric according to the present embodiment. As shown in the FIGURE, a composite fiber 1, which is a raw material fiber of the non-woven fabric of the present embodiment, is a fiber of so-called "core-sheath structure" in which a core part 2 and a sheath part 3 covering the core part 2 are integrally formed. The core-sheath structure of the composite fiber 1 may be an eccentric structure. In the composite fiber of the core-sheath structure, an area of fusion-bonding between fibers and a fiber diameter can be varied by adjusting a ratio of a sheath and a core (ratio of cross section area), and thus the properties of the non-woven fabric such as strength, pore diameter and thickness can be easily changed by using the composite fiber of a core-sheath structure as a raw material.

The core part 2 and the sheath part 3 of the composite fiber 1 are consisting of polyolefin-based resins having different melting points, and the sheath part 3 is formed of a polyolefin-based resin having a lower melting point (also referred to as "second polyolefin-based resin") than that of a polyolefin-based resin constituting the core part 2 (also referred to as "first polyolefin-based resin").

The type of the polyolefin-based resins constituting the core part 2 and the sheath part 3 are not particularly limited, and for example, the first polyolefin-based resin constituting the core part 2 may be polypropylene resin, and the second polyolefin-based resin constituting the sheath part 3 may be polyethylene. In the composite fiber manufactured using this combination, sheath parts 3 are easily fusion-bonded each other due to appropriate difference in melting points, and a non-woven fabric having excellent strength can be manufactured. The first polyolefin-based resin and the second polyolefin-based resin may be polymer alloys in which two or more polyolefins are mixed, and various additives such as anti-oxidant, neutralizing agent, photostabilizer, lubricant and antistatic agent may be comprised in those resins.

The composite fiber 1 preferably has a fiber strength of 4 cN/dTex or more and a heat shrinkage rate of 4 to 8% at 120° C. When the fiber strength and heat shrinkage rate of the composite fiber 1 are within the above-mentioned range, excellent properties can be obtained in the case of using it for a battery separator. When the heat shrinkage rate of the composite fiber 1 at 120° C. is less than 4%, desired fiber strength may not be obtained due to insufficient stretching, and when the heat shrinkage rate is more than 8%, the composite fiber 1 may be deformed due to increase in temperature inside a battery when used as a battery separator and may cause short-circuit.

On the other hand, the length (chop length) of the composite fiber 1 can be appropriately determined depending on properties desired for a non-woven fabric and so on, and may be for example in the range of 0.7 mm or more and 3 mm or less when the composite fiber 1 is used as a battery separator. When the chop length of the composite fiber 1 which is a raw material fiber is in this range, entanglement of fibers is suppressed in a paper-making process, and thus a non-woven fabric having high strength and uniformity can be manufactured. Furthermore, in terms of enhancement of strength and reduction of the amount of strain, a composite fiber 1 having a fiber diameter of 3.4 to 4.5 μm is preferably used.

[Basis Weight]

The non-woven fabric of the present embodiment has a basis weight (mass per unit area) of 3 $g/m^2$ or more. When the basis weight is less than 3 $g/m^2$, sufficient strength cannot be obtained and thus handleability is reduced. Furthermore, since an amount of deformation during applying tension is large and a pore diameter is too large, when the non-woven fabric is used for a battery separator, electrodes may contact with each other through pores resulting in increase of risk of generating short-circuit etc. On the other hand, the upper limit of basis weight of the non-woven fabric is not particularly limited, but is preferably 20 $g/m^2$ or less in terms of easy manufacturing.

[Thickness]

The thickness of the non-woven fabric of the present embodiment is not particularly limited, but is preferably 60 μm or less in terms of easy manufacturing and securing of battery properties when it is applied to a battery separator.

[Amount of Strain]

The non-woven fabric of the present embodiment has an amount of strain, S, of 50 $mm^2$ or less as calculated by the formula 2 below. "$MD_0$" and "$CD_0$" in the formula 2 below are effective lengths in MD direction and CD direction respectively of a sample before applying a tensile stress, and are 100 mm both in MD direction and CD direction. "$MD_1$"

and "$CD_1$" are effective lengths (mm) in MD direction and CD direction respectively of a sample measured during applying a tensile strength of 20 N in MD direction under an environment of a room temperature of 25° C. and a humidity of 50% RH.

$$S \text{ (mm}^2\text{)}=(MD_1-MD_0)\times(CD_0-CD_1) \quad \text{[Formula 2]}$$

When the amount of strain, S, calculated from the above formula 2 is more than 50 mm², an amount of deformation relative to tensile stress is higher, risk of mutual contact of electrodes increases in the case of using the fabric for a battery separator, resulting in reduction of yield for a mounting process. On the other hand, when the amount of strain, S, of the non-woven fabric is 50 mm² or less, sufficient rigidity to withstand various practical uses can be obtained even in a non-woven fabric of low basis weight or a thin non-woven fabric.

[Tensile Strength]

In the non-woven fabric of the present embodiment, tensile strength per unit basis weight in at least one of CD direction and MD direction is preferably 0.6 (N/15 mm)/(g/m²) or more. As a result, even a thin non-woven fabric having a thickness of 60 μm or less has a tensile strength equal to or higher than a conventional one, and can provide a battery separator thinner than a conventional one and having an excellent performance. Furthermore, such a thin non-woven fabric having an excellent strength can be applied to not only a battery separator but also to various fields such as uses of a filter and a membrane for water treatment and air treatment, uses of a reinforcing material, a base fabric for electromagnetic wave shield.

[Pore Diameter]

The non-woven fabric of the present embodiment, especially in the case of being used for a battery separator, preferably has a maximum pore diameter of 50 μm or less and an average pore diameter of 5 to 25 μm in terms of enhancement of battery properties. When the maximum pore diameter is more than 50 μm, active materials of electrodes may contact with each other through pores of the non-woven fabric, resulting in increase of risk of short-circuit.

On the other hand, a smaller maximum pore diameter of a non-woven fabric is more preferable in terms of reduction of risk of short-circuit, however, in order to obtain an average pore diameter of less than 5 μm, it is necessary to increase the basis weight or density of a non-woven fabric, or to close pores by heat press etc. so that the non-woven fabric is in a state close to a film. Both of those methods cause increase in membrane resistance and thus reduction of battery properties, and in addition, those methods are disadvantageous with respect to manufacturing cost. When an average pore diameter is in the range of 5 to 25 μm, the non-woven fabric suitable for a battery separator can be obtained. A "maximum pore diameter" and "average pore diameter" of a non-woven fabric can be measured by, for example, a permporometry method.

As described above in detail, the non-woven fabric of the present embodiment uses a composite fiber of a core-sheath structure consisting of a polyolefin-based resin, the basis weight and the tensile strength in CD direction are above specific values, and thus even a thin non-woven fabric having a thickness of 60 μm or less can provide a tensile strength equal to or higher than a conventional one having a thickness of about 100 μm. Furthermore, since the non-woven fabric of the present embodiment has an excellent strength though it is thin, it is suitable for a battery separator, and handleability during manufacture of batteries can be enhanced by using this non-woven fabric.

Second Embodiment

The battery separator according to the second embodiment of the present invention uses the above-mentioned non-woven fabric of the first embodiment, and for example, the non-woven fabric is used as a substrate, and an insulating layer comprising one or more inorganic particles is provided on at least one surface of the substrate. The insulating layer may be formed in such a way that inorganic particles are laminated via a binder resin etc. on the surface of the non-woven fabric substrate, or in such a way that inorganic particles penetrate into a part of the non-woven fabric substrate. The above-mentioned insulating layer is not an essential constituent for a separator, and a non-woven fabric can be used alone for a separator without providing an insulating layer.

The inorganic particles contained in the insulating layer may be any inorganic particles which has insulating property, and common inorganic particles such as boehmite particle, alumina particle and silica particle can be used. However, when an electrolyte comprises a fluorine-based substance, use of silica particle causes generation of hydrogen fluoride and erosion of the insulating layer, and thus boehmite particle or alumina particle is preferably used.

The thickness of the insulating layer is not particularly limited, and appropriately determined according to the type, performance and size of the battery. However, when the insulating layer is thicker, air impermeability reduces, and when the insulating layer is thinner, short-circuit easily occurs due to a dendrite. Therefore, the thickness of the insulating layer is preferably 2 to 20 μm, more preferably 4 to 8 μm in terms of enhancement of air impermeability and prevention of internal short-circuit.

The battery separator of the present embodiment is immersed in an electrolyte prepared by dissolving $LiPF_6$ in a solvent obtained by mixing ethylene carbonate and methyl ethyl carbonate in a volume ratio of ethylene carbonate: methyl ethyl carbonate=3:7 to a concentration of 1.1 mol/L, and then membrane resistance value measured by sandwiching the separator using aluminum plates is 0.002 to 0.007 Ω/μm. When the membrane resistance value of the separator is in this range, good battery properties are obtained.

The battery separator of the present embodiment uses the non-woven fabric of the first embodiment, and thus it has a high tensile strength and excellent handleability even in the case of a thinner separator. Furthermore, since the battery separator of the present embodiment has a low membrane resistance value, enhancement of battery properties can be expected when the separator is applied to a lithium ion secondary battery etc. In particular, in the battery using lithium titanate (LTO) as a negative electrode, its operation potential is sufficiently higher than the deposition potential of lithium metal, risks of penetration through a separator due to a generated lithium dendrite and short-circuit caused thereby do not exist, and thus it is not necessary to laminate an insulating layer etc. on the non-woven fabric. Therefore, the battery separator using the non-woven fabric of the first embodiment provide lower internal resistance in addition to lower cost, and thus can contribute to achievement of a battery having high input-output characteristics.

EXAMPLES

Hereinafter, the effects of the present invention will be specifically described with reference to Examples and Comparative Examples. In the present Examples, the non-woven fabrics of Examples and Comparative Examples were produced in the following method, and the performance thereof were evaluated.

<No. 1>

The non-woven fabric of No. 1 was produced using the composite fiber of a core-sheath structure for a raw material fiber in which the core part is polypropylene resin (PP), the sheath part is polyethylene resin (PE), the ratio of PP to PE in a cross-section perpendicular to length direction is 50%: 50%, and the fiber diameter is 4.6 μm. Specifically, at first, each raw material fiber was cut into a length of 3 mm to obtain a short fiber, which was then dispersed uniformly in water to which a viscosity modifier was added to prepare a dispersion.

Next, this dispersion was fed into a cylinder paper machine, and subjected to a yankee dryer process at 130 to 140° C., and thus the sheath parts of the composite fiber were integrated by being fusion-bonded to each other to obtain a non-woven fabric having a thickness of 26 μm and a basis weight of 10.3 g/m².

<No. 2>

The non-woven fabric of No. 2 having a thickness of 11 μm and a basis weight of 3.3 g/m² was produced in the same way and under the same conditions as in Example 1 described above except that the fiber diameter of the raw material fiber was 4.2 μm.

<No. 3>

The non-woven fabric of No. 3 having a thickness of 55 μm and a basis weight of 19.0 g/m² was produced in the same way and under the same conditions as in No. 2 described above.

<No. 4>

The non-woven fabric of No. 4 having a thickness of 15 μm and a basis weight of 7.3 g/m² was produced in the same way and under the same conditions as in No. 2 described above except that the fiber length of the raw material fiber was 2 mm.

<No. 5>

The non-woven fabric of No. 5 having a thickness of 16 μm and a basis weight of 6.9 g/m² was produced in the same way and under the same conditions as in No. 4 described above except that the fiber diameter of the raw material fiber was 3.7 μm.

<No. 6>

The non-woven fabric of No. 6 having a thickness of 11 μm and a basis weight of 5.0 g/m² was produced in the same way and under the same conditions as in No. 5 described above.

<No. 7>

The non-woven fabric of No. 7 having a thickness of 25 μm and a basis weight of 11.0 g/m² was produced in the same way and under the same conditions as in No. 5 described above.

<No. 8>

The non-woven fabric of No. 8 having a thickness of 16 μm and a basis weight of 6.7 g/m² was produced in the same way and under the same conditions as in No. 5 described above except that the fiber length of the raw material fiber was 1 mm.

<No. 9>

The non-woven fabric of No. 9 having a thickness of 16.6 μm and a basis weight of 5.0 g/m² was produced in the same way and under the same conditions as in No. 1 described above except that the fiber diameter of the raw material fiber was 5.3 μm.

<No. 10>

The non-woven fabric of No. 10 having a thickness of 9 μm was produced in the same way and under the same conditions as in No. 1 described above except that the basis weight of the non-woven fabric was 2.9 g/m².

(Evaluation)

Evaluation of each non-woven fabric of the Example, Comparative Example and Reference Example produced by the above method was conducted in the following method.

[Thickness]

The thickness of any 3 points of each non-woven fabric was measured using a micrometer (manufactured by Mitutoyo Corporation, Coolant Proof micrometer MDC-25MJ), and the average value thereof was calculated.

[Basis Weight]

The basis weight of each non-woven fabric was measured at 5 points using the method specified in JIS P8124, and the average value thereof was calculated.

[Density]

The basis weight measured in the method specified in JIS P8124 was divided by the respective thickness, and the obtained value was defined as the density of each non-woven fabric.

[Average Pore Diameter, Maximum Pore Diameter]

The average pore diameter and the maximum pore diameter are measured using a pore diameter distribution measurement apparatus (manufactured by Quantachrome Instruments Japan G.K., Porometer 3G zh).

[Amount of Strain]

The amounts of strain in CD direction and MD direction were measured by cutting out an evaluation sample having a length in MD direction of 120 mm and a length in CD direction of 100 mm from each non-woven fabric of Examples and Comparative Examples and conducting measurements using Tensilon tester. Specifically, a tensile stress was applied to the sample in MD direction at a distance between chucks of 100 mm and a tensile speed of 5 mm/min, and after the tensile stress reached 20 N, dimensions in MD direction and CD direction were measured in about 5 seconds.

Then, the amount of strain was calculated from the above formula 2 based on the measured dimensions. In that case, a measurement atmosphere was a room temperature of 25° C. and a humidity of 50% RH, measurements were conducted 3 times under the same conditions, and the average value thereof was calculated. The effective lengths of a sample before applying a tensile stress were 100 mm in MD direction and 100 mm in CD direction. The reason why the tensile stress was 20 N was that assumption that a winding tension applied to a non-woven fabric in a manufacturing process by roll-to roll method was 20 N was considered to be appropriate.

[Tensile Strength]

The tensile strength in CD direction and MD direction was measured using Tensilon tester. Specifically, at first, an evaluation sample having a length in MD direction of 70 mm and a length in CD direction of 15 mm was cut out for measurement in MD direction and an evaluation sample having a length in CD direction of 70 mm and length in MD direction of 15 mm was cut out for measurement in CD direction respectively from each non-woven fabric of Examples and Comparative Examples. Next, the upper and lower ends of longitudinal direction of the evaluation sample were attached to chucks, and the breaking strength was measured for CD direction and MD direction respectively under conditions of a distance between chucks of 30 mm and a tensile speed of 5 mm/min.

Then, the tensile strength per unit basis weight was calculated by dividing the measurement value by the basis weight (g/m²) of the non-woven fabric. In that case, a measurement atmosphere was a room temperature of 25° C. and a humidity of 50% RH, measurements were conducted 3 times under the same conditions, and the average value thereof was calculated. In the present Example, a tensile strength per unit basis weight of 0.6 (N/15 mm)/(g/m²) or more in each of CD direction and MD direction was regarded as passed and equal to or higher than those of a conventional one.

[Membrane Resistance]

A membrane resistance was measured in the following method. At first, an aluminum sheet having a thickness of 40 μm was cut into a size of 50 mm×45 mm for the first electrode, and a region having a length of 15 mm from the end of the short side was used as an overlap width for connecting to an aluminum electrode tab. An aluminum electrode tab having a width of 5 mm, a length of 60 mm and a thickness of 100 μm was ultrasonic-welded to the end of the overlap width part of the aluminum sheet perpendicularly to the short side, then the whole overlap width part including the welded part was covered with a polyimide tape having a width of 15 mm to be insulation treated.

Similarly, an aluminum sheet which is same as the first electrode was cut into a size of 55 mm×50 mm for the second electrode, and a region having a length of 15 mm from the end of the short side was used as an overlap width for connecting to an aluminum electrode tab. An aluminum electrode tab having a width of 5 mm, a length of 60 mm and a thickness of 100 μm was ultrasonic-welded to the end of the overlap width part of the aluminum sheet perpendicularly to the short side, then the whole overlap width part including the welded part was covered with a polyimide tape having a width of 15 mm to be insulation treated.

The electrode components produced by the above method were laminated in the order of the first electrode/non-woven fabric/the second electrode, and disposed so that the whole effective area (50 mm×30 mm) of the first electrode may oppose to the second electrode via the non-woven fabric. In that case, the size of the non-woven fabric was 60 mm×60 mm. Next, an aluminum laminate film cut into a size of 160 mm×100 mm was prepared, double-folded in a longitudinal direction. The laminated product of the first electrode/non-woven fabric/the second electrode was sandwiched in the folded film, which was heat-sealed except for one side to form bag-shape.

An electrolyte obtained by dissolving $LiPF_6$ as a solute in a solvent obtained by mixing ethylene carbonate and methyl ethyl carbonate in a volume ratio of ethylene carbonate:methyl ethyl carbonate=3:7 to a concentration of 1.1 mol/L was injected in an amount of 1 ml into the aluminum laminate film formed into a bag-shape. Then, the remained one side of the aluminum laminate film was heat-sealed while being impregnated with the electrolyte under a reduced pressure to produce a laminate cell. Two cells were produced by this method, one of which had one non-woven fabric and the other had a laminate of 3 non-woven fabrics between electrodes.

After the produced two cells were left to stand under an environment at 25° C. overnight, AC impedance was measured under conditions of a voltage amplitude of 10 mV and a frequency of 10 Hz to 5000 kHz in an atmosphere at 25° C. The obtained AC resistance was plotted with respect to a number of the non-woven fabric, and the AC resistance per non-woven fabric was calculated from the inclination of a straight line connecting the plotted points. The membrane resistance per unit thickness (S/μm) was calculated by dividing the obtained AC resistance per non-woven fabric by its thickness.

The results of the above are summarized in Table 1 below. Nos. 1 to 8 shown in Table 1 below are Examples within the range of the present invention, and Nos. 9 and 10 are Comparative Examples outside the range of the present invention.

TABLE 1

| Evaluation items of non-woven fabric | | Example | | | | | | | | Comparative Example | |
|---|---|---|---|---|---|---|---|---|---|---|---|
| | | No. 1 | No. 2 | No. 3 | No. 4 | No. 5 | No. 6 | No. 7 | No. 8 | No. 9 | No. 10 |
| Composite fiber | Fineness (dtex) | 0.15 | 0.13 | 0.13 | 0.13 | 0.10 | 0.10 | 0.10 | 0.10 | 0.20 | 0.15 |
| | Fiber diameter (μm) | 4.6 | 4.2 | 4.2 | 4.2 | 3.7 | 3.7 | 3.7 | 3.7 | 5.3 | 4.6 |
| Thickness (μm) | | 26 | 11 | 55 | 15 | 16 | 11 | 25 | 16 | 16.6 | 9 |
| Basis weight (g/m²) | | 10.3 | 3.3 | 19.0 | 7.3 | 6.9 | 5.0 | 11.0 | 6.7 | 5.0 | 2.9 |
| Density | | 0.40 | 0.31 | 0.33 | 0.49 | 0.43 | 0.45 | 0.44 | 0.42 | 0.30 | 0.32 |
| Average pore diameter (μm) | | 8.6 | 22.8 | 18.6 | 11.0 | 9.3 | 12.8 | 7.0 | 11.8 | 58.8 | 26.2 |
| Maximum pore diameter (μm) | | 12.4 | 46.4 | 18.7 | 17.4 | 13.3 | 21.5 | 8.7 | 18.3 | 66.0 | 57.3 |
| Air permeability (s/100 ml) | | 0.14 | <0.01 | 0.12 | 0.07 | 0.07 | 0.04 | 0.14 | 0.05 | <0.01 | <0.01 |
| Amount of strain (mm²) | | 0.6 | 50 | 0.1 | 4.2 | 2.9 | 6.0 | 0.6 | 3.3 | 60 | Unmeasurable |
| Tensile strength | MD | 1.55 | 1.23 | 1.61 | 1.89 | 1.15 | 1.67 | 1.19 | 1.12 | 1.37 | 1.09 |
| [(N/15 mm)/(g/m²)] | CD | 0.8 | 0.62 | 1.02 | 0.95 | 0.61 | 0.90 | 0.75 | 0.71 | 0.55 | 0.50 |
| Membrane resistance (Ω/μm) | | 0.0052 | 0.0050 | 0.0034 | 0.0047 | 0.0027 | 0.0033 | 0.0031 | 0.0031 | 0.0076 | 0.0067 |

As shown in Table 1 above, since the non-woven fabric of Comparative Example No. 9 had an amount of strain above the range of the present invention, a tensile strength per unit basis weight in CD direction was less than 0.6 (N/15 mm)/(g/m²) and the strength was insufficient. Furthermore, the non-woven fabric of Comparative Example No. 9 had a large fiber diameter of a composite fiber, and thus high membrane resistance per unit thickness. The non-woven fabric of Comparative Example 10 had a basis weight of less than 3.0 g/m², and thus the tensile strength per unit basis weight in CD direction did not reach 0.6 (N/15 mm)/(g/m²).

On the other hand, the non-woven fabric of Nos. 1 to 8 which are Examples of the present invention had a tensile strength per unit basis weight of 0.6 (N/15 mm)/(g/m²) or more in both CD direction and MD direction even in the case of thickness of 60 μm or less, which was the tensile strength equal to or higher than that of a conventional product having a thickness of 100 μm. In particular, since the non-woven fabric of Example 6 had a small amount of strain, the tensile strength was high and the membrane resistance was low though the thickness was thin as low as 11 μm.

REFERENCE SINGS LIST

1 Composite fiber
2 Core
3 Sheath

The invention claimed is:

1. A battery separator consisting of a single layer of a non-woven fabric having a thickness of 60 μm or less, the non-woven fabric being formed by integrating a composite fiber of a core-sheath structure consisting of a core part and a sheath part covering the core part by fusion-bonding the sheath parts each other, wherein
the composite fiber has a fiber diameter of 3.4 to 4.5 μm,
the core part is formed of a first polyolefin-based resin,
the sheath part is formed of a second polyolefin-based resin having a melting point lower than that of the first polyolefin-based resin,
a basis weight is 3 to 20 g/m², and
an amount of strain, S, as calculated by a following formula (I)

$$S \text{ (mm}^2\text{)} = (MD_1 - MD_0) \times (CD_0 - CD_1) \quad (I)$$

is 50 mm² or less wherein $MD_1$ (mm) and $CD_1$ (mm) are lengths in MD direction and CD direction respectively when a tensile stress of 20 N in MD direction is applied to a sample having an effective length in MD direction ($MD_0$) of 100 mm and an effective length in CD direction ($CD_0$) of 100 mm under an environment of a room temperature of 25° C. and a humidity of 50% RH.

2. The battery separator according to claim 1, wherein in the composite fiber,
the first polyolefin-based resin is a polypropylene resin,
the second polyolefin-based resin is a polyethylene resin, and
a strength is 4 cN/dTex or more.

3. The battery separator according to claim 1, wherein a maximum pore diameter is 50 μm or less and an average pore diameter is 5 to 25 μm.

4. The battery separator according to claim 1, wherein a tensile strength per unit basis weight in CD direction and MD direction is 0.6 (N/15 mm)/(g/m²) or more.

5. The battery separator according to claim 1 wherein
after the battery separator is immersed in an electrolyte prepared by dissolving $LiPF_6$ in a solvent obtained by mixing ethylene carbonate and methyl ethyl carbonate in a volume ratio of ethylene carbonate:methyl ethyl carbonate=3:7 to a concentration of 1.1 mol/L, a membrane resistance value measured by sandwiching the separator using aluminum plates is 0.002 to 0.007 Ω/μm.

6. The battery separator according to claim 1, wherein the composite fiber has a heat shrinkage rate of 4 to 8% at 120° C.

7. The battery separator according to claim 1, wherein the length of the composite fiber is in range of 0.7 mm or more and 3 mm or less.

\* \* \* \* \*